United States Patent [19]

MacIntyre et al.

[11] Patent Number: 4,917,814

[45] Date of Patent: Apr. 17, 1990

[54] PIGMENTED HYPOCHLORITE COMPOSITIONS

[75] Inventors: Debra MacIntyre, Hamilton; Carl Triplett, Milford, both of Ohio

[73] Assignee: The Drackett Company, Cincinnati, Ohio

[21] Appl. No.: 230,937

[22] Filed: Aug. 11, 1988

[51] Int. Cl.[4] ..................... D06L 3/08; C11D 3/395; C01B 11/06

[52] U.S. Cl. ..................... 252/102; 252/187.24; 252/187.25; 252/187.26; 252/186.33; 252/95; 134/2

[58] Field of Search ..................... 252/187.24, 187.25, 252/187.26, 186.33, 98, 102

[56] References Cited

U.S. PATENT DOCUMENTS

| | | | |
|---|---|---|---|
| 3,684,722 | 8/1972 | Hynam et al. | 252/98 |
| 4,011,172 | 3/1977 | Marsan et al. | 252/187 R |
| 4,193,888 | 3/1980 | McHugh | 252/187.1 |
| 4,271,030 | 6/1981 | Brierly et al. | 252/98 |
| 4,282,109 | 8/1981 | Citrme et al. | 252/102 |
| 4,337,163 | 6/1982 | Schilp | 252/96 |
| 4,388,204 | 6/1983 | Dimond et al. | 252/98 |
| 4,399,050 | 8/1983 | Bentham et al. | 252/95 |
| 4,457,855 | 7/1984 | Sudbury et al. | 252/98 |
| 4,474,677 | 10/1984 | Foxlee | 252/98 |
| 4,554,091 | 11/1985 | Jones et al. | 252/187.25 |
| 4,585,570 | 4/1986 | Nelson | 252/102 |
| 4,588,514 | 5/1986 | Jones et al. | 252/98 |
| 4,599,186 | 7/1986 | Choy et al. | 252/102 |
| 4,623,476 | 11/1986 | Nayar et al. | 252/94 |
| 4,657,692 | 4/1987 | Choy et al. | 252/99 |
| 4,708,816 | 11/1987 | Chang et al. | 252/186.25 |

FOREIGN PATENT DOCUMENTS

| | | |
|---|---|---|
| 894194 | 2/1972 | Canada . |
| 184888 | 6/1986 | European Pat. Off. . |
| 53-8604 | 1/1978 | Japan . |
| 61-264098 | 11/1986 | Japan . |
| 1128411 | 9/1968 | United Kingdom . |
| 1466560 | 3/1977 | United Kingdom . |
| 1548379 | 7/1979 | United Kingdom . |

OTHER PUBLICATIONS

Tech. Data, Newport Green No. 187, Shepherd Color Company (1981).

Patton, Pigment Handbook, Synthetic Inorganic Complexes, vol. I, pp. 419–427 (1973).

Tech Data, Ensign Blue No. 214, Shepherd Color Company (1986).

Lister, Canadian J. Chem., vol. 34, pp. 479–488 (1956).

Hackman, Tech. Report-Cobalt Aluminates, Shepherd Color Company (1987).

*Primary Examiner*—Brooks H. Hunt
*Assistant Examiner*—Virginia B. Caress
*Attorney, Agent, or Firm*—Charles J. Zeller

[57] ABSTRACT

An aqueous composition comprising a hypochlorite source in an effective oxidizing concentration and a colorant system containing at least one pigment selected from the group consisting of cobalt aluminate and cobalt chromite.

21 Claims, No Drawings

PIGMENTED HYPOCHLORITE COMPOSITIONS

BACKGROUND OF INVENTION

This invention relates to hypochlorite compositions and, more particularly, to such compositions containing an inorganic pigment system comprising at least cobalt aluminate as a coloring agent.

Hypochlorite compositions are widely used in the home and in industry that take advantage of the oxidizing capability of the hypochlorite. Thus, they have been used as textile bleaching agents and in the general purpose cleaning and bleaching of hard surfaces such as dishes, glasses, metal surfaces, pots, pans, sinks, tubs, toilet bowls and the like. It is also used in scouring abrasive compositions. Because of its capability of attacking protein fibers and food, it has been used in compositions designed as drain cleaners, i.e., for unclogging clogged drains.

In certain of these applications it is advantageous to color the hypochlorite compositions. A blue color is often preferred. However, because of the propensity of the hypochlorite to destroy most organic coloring agents, this has presented something of a problem.

Efforts have been made to avoid this problem by using inorganic pigments as coloring agents. The pigment most widely used to provide a color to hypochlorite compositions has been ultramarine, especially ultramarine blue. Ultramarines are a class of pigments that are essentially blue but have shades ranging from a red cast (called ultramarine violet or ultramarine red) to a green cast (called ultramarine green). These have been described as complex combinations of silica, alumina, soda and chemically combined sulfur. Ultramarine blue has most typically been incorporated in the prior art compositions, blue being the color consumers seem to prefer in cleaning compositions such as herein described.

However, the use of ultramarines in hypochlorite containing compositions has left something to be desired. More particularly, the capability of these compositions to retain their color at a satisfactory level under storage conditions over extended periods of time has been found to be wanting.

INVENTION

It has now been found that the disadvantages of using ultramarine blue as the coloring pigment in hypochlorite containing compositions may be avoided if cobalt aluminate is used as the pigment. Cobalt aluminate imparts a persistent blue color to the hypochlorite containing compositions, which was quite unexpected since there was no reason to suspect that cobalt aluminate would be more stable than ultramarine blue in hypochlorite compositions. Although certain manufactures' literature indicates that the cobalt aluminates are generally inert to attack by acid and alkali and are not subject to oxidation/reduction by ordinary chemical means, there is nothing to suggest the superior stability of cobalt aluminate over ultramarine blue in hypochlorite containing compositions.

Also surprising and unexpected in the use of cobalt aluminate in the hypochlorite compositions of this invention is the fact that the hypochlorite stability is affected only minimally by cobalt aluminate. This is unexpected in light of the teachings in the prior art that the decomposition of sodium hypochlorite is catalyzed by the oxides of cobalt (see M. W. Lister, *Decomposition of*

*Sodium Hypochlorite: The Catalyzed Reaction*, Canadian Journal of Chemistry, Vol. 34, 1956, p. 479).

Although the use of a cobalt aluminate is of particular advantage in the practice of the present invention it has also been found that a cobalt chromite may also be used to advantage. The latter is inclined to be a little greener in color than the former and may be employed where this greener color is not perceived as being less appealing to the consumer. It will be understood that the terms "cobalt aluminate" and "cobalt chromite" are words of art well recognized in the pigment art and will be described in more detail below. Although these terms do not conform to strict chemical nomenclature those skilled in this art are well aware of their meaning.

To simplify the description of this invention reference will be made below to the use of cobalt aluminates. It will be understood that these comments are also applicable to cobalt chromites. In addition unless specifically otherwise intended by the context of the specification, ultramarine blue shall mean ultramine pigments generally.

PRIOR ART

Besides the use of ultramarine blue to color hypochlorite compositions a variety of coloring agents have been suggested for use in the prior art. A sampling such prior art is given below.

U.S. Pat. No. 4,457,855 to Sudbury et al discloses the use of certain anthraquinone dyes as coloring agents for hypochlorite compositions.

U.S. Pat. No. 4,474,677 to Foxlee suggests the use of certain halogenated metal phthalocyanine pigments for the same purpose;

U.S. Pat. No. 4,554,091 to Jones et al teaches coloring aqueous bleaching compositions containing hypochlorite with a colored polymer latex;

U.S. Pat. No. 4,708,816 to Chang et al proposes microencapsulating coloring material to be incorporated in hypochlorite liquid bleach compositions;

Japanese Patent No. 61/264,098 discloses a colored hypochlorite detergent composition that contains copper phthalocyanine as a coloring agent;

U.S. Pat. No. 4,271,030 to Brierley et al teaches a colored liquid hypochlorite bleach composition in which a particular ultramarine blue is suspended by means of calcium soap flocs; titanium dioxide is also suggested for use in this patent as an opacifier.

DETAILED DESCRIPTION

As is indicated above the present invention concerns itself with providing a blue coloring system for hypochlorite containing compositions. The term "hypochlorite composition" is used herein to refer to compositions that contain hypochlorite ions ($ClO^-$) in sufficient concentration to function as an oxidizing agent. The hypochlorite ion may be supplied to these compositions in a variety of forms. Usually it will take the form of an alkali metal hypochlorite, or any organic chlorine releasing compound. These are exemplified by such compounds as sodium hypochlorite, potassium hypochlorite, lithium hypochlorite, trichloroisocyanuric acid, persulfate/NaCl mixture, etc. For reasons of economy and availability the alkali metal hypochlorites and especially sodium hypochlorite is preferred for use in the present invention.

The quantity of hypochlorite that will be contained in the compositions of this invention may vary depending upon the specific end use or the form that the composition may take. In general, it may be said, that an oxidizing amount of the hypochlorite will be present in these compositions, i.e., sufficient hypochlorite will be present so that it may function as an effective oxidizing agent. Usually, this concentration will be in the range of from about 0.5% to about 10% by weight hypochlorite based on the total weight of the composition with the preferred concentration being from about 1% to about 7% hypochlorite on the same weight basis, and most preferably from about 2% to about 5% hypochlorite.

As also indicated above it is a feature of the present invention to utilize a cobalt aluminate as the coloring pigment for the hypochlorite compositions of the present invention. Cobalt aluminates are usually made by the calcination of a mixture of cobalt oxide and aluminum hydroxide and has a greenish blue tint. One type of material that has special utility for the present invention is known in the art as Cobalt Aluminate Blue Spinel (C.I. Pigment Blue 28). This is a reaction product of high temperature calcination in which cobalt (II) oxide and aluminum (III) oxide in varying amounts are homogeneously and ionically interdiffused to form a crystalline matrix spinel. This has the basic chemical formula $Co_2Al_2O_4$. It may also include one or more modifiers such as $Li_2O$, MgO, $TiO_2$ or ZnO. (See "DCMA Classification and Chemical Description of the Mixed Metal Oxide Inorganic Colored Pigments", Second Edition, January 1982, p. 29, Metal Oxides and Ceramic Colors Subcommittee Dry Color Manufacturers' Association.)

The particle size of the cobalt aluminate pigments that may be employed in the present invention may vary. Generally, these particles will be below about 5 microns in size with about 0.10 micron being a lower practical limit. The more typical range of particle size for these pigments is from about 2.75 microns to about 0.25 micron. An average particle size of about 1 micron is preferred. Such particle size can be achieved by conventional methods of particle reduction such as by jet milling.

The quantity of cobalt aluminate that may be contained in the hypochlorite compositions of this invention may vary depending upon the use of the particular composition or the depth of color desired. All that is required is that a tinctorially effective amount of pigment be contained in the composition, that is to say that the pigment be present in sufficient amount to give the composition the desired color. However, generally this will amount to from about 0.001% to about 0.5% by weight cobalt aluminate based on the total weight of the composition. In the preferred practice of this invention the cobalt aluminate will be present in the hypochlorite composition in the range of from about 0.01% to about 0.1% by weight based on the total weight of the composition in which it is contained. The higher levels of pigment present in the compositions of the present invention are typically incorporated in compositions of high viscosity.

As indicated above, another class of pigments that may be used in the practice of the present invention are known in this art as cobalt chromites. These are more specifically known as cobalt chromite green spinels and are identified as inorganic pigments and reaction products of high temperature calcination in which cobalt (II) oxide and chromium (III) oxide in varying amounts are ionically interdiffused to form a crystalline matrix of spinel. The basic chemical formula is given as $CoCr_2O_4$ and its composition may include any one or more or a combination of modifiers such as $Al_2O_3$, MgO, $SiO_2$, $TiO_2$, ZnO or $ZrO_2$. An example of a cobalt chromite that is useful for the purposes of the present invention and which is available commercially is a product known as Newport Green No. 187 marketed by the Shepherd Color Company. This is described as a medium dark blue-green powder produced by high temperature calcination of oxides of Co, Cr, Mg, Al and Zn. This material has an average particle size of 0.8 micron and a density of 4.67 g/cc. It may be used in the same concentrations as described above in connection with the cobalt aluminates in formulating the products of the present invention.

Although the present invention has application to a variety of hypochlorite compositions it is especially applicable to the coloring of the so-called thickened hypochlorite bleach and/or detergent systems. These systems are particularly advantageous for the present invention in that they allow the pigments to be dispersed through the medium that constitutes the thickened system.

The viscosity of the thickened hypochlorite detergent system utilized in this aspect of the invention may also vary somewhat. Generally, this viscosity will be in the range of from about 50 cps. to about 5,000 cps., although the viscosity could be higher for speciality products in gel or paste form. In a preferred aspect of this feature of the invention, this viscosity will be in the range of from about 100 cps. to about 610 cps. In some instances, the addition of cobalt aluminate to the thickened hypochlorite detergent systems of the present invention increases the compositions' viscosity.

A large number of thickened hypochlorite bleach and/or detergent system are known in the prior art in which the present invention may be employed.

By way of example, mention may be made of the system described in the following patents: U.S. Pat. Nos. 4,585,570; 4,588,514; G.B. Nos. 1,466,560; 1,548,379; U.S. Pat. Nos. 3,684,722; 4,011,172; 4,282,109 and 4,337,163, each being incorporated herein by way of reference. Of particular utility for the present invention are the thickened hypochlorite compositions described in U.S. Pat. No. 4,388,204 to Harold L. Dimond and Thomas J. Murphy which is also incorporated herein by way of reference. As disclosed in said Dimond and Murphy patent, a thickened aqueous solution of an alkali metal hypochlorite is prepared by incorporating in said hypochlorite solution an anionic surfactant system comprising:

(A) at least one alkali metal salt of an ethoxylated aliphatic alcohol;

(B) at least one alkali metal salt of an N-alkyl, N-fatty acyl amino acid; and (C) at least one alkali metal salt of an alkyl sulfate.

In a number of instances the surfactant system may comprise combination of surfactants of classes (B) and (C) above without any surfactant from class (A). In either case, the surfactants are incorporated in the hypochlorite solution in sufficient amounts to provide the desired degree of thickness for the particular end use of the compositions.

Table I below gives the relative general concentrations and the preferred concentrations of the various types of anionic surfactants that may be contained in the compositions of this invention. The percentage given are percent by weight based on the total weight of the particular composition.

TABLE I

| Surfactant | | General Range w/w % | Preferred Range w/w % |
|---|---|---|---|
| (A) | Alkali metal salts of ethoxylated aliphatic alcohols | from about 0% to about 40% | from about 0.1% to about 1.5% |
| (B) | Alkali metal salts of N-alkyl, N-fatty acyl amino acids | from about 0.1% to about 50% | from about 0.1% to about 1.5% |
| (C) | Alkali metal salts of alkyl sulfates | from about 1% to about 75% | from about 1% to about 5% |

The alkali metal salts of ethoxylated aliphatic alcohols (i.e. surfactants (A) above) that are useful for the present purpose may be defined more particularly by the general formula:

$$RO(CH_2-CH_2O)_nSO_3^-M^+ \quad (I)$$

where R represents an aliphatic group of from 8 to 18 carbon atoms, (preferably about 10 to 14 carbon atoms), M is an alkali metal, (preferably sodium or potassium, and most preferably sodium), and n is a number of from 1 to 9, preferably from about 2 to about 7.

These compounds are also generally known as alkali metal alcohol ether sulfates or alkali metal alcohol ethoxy sulfates. Examples of suitable compounds as component (A) include sodium, potassium or lithium salts of lauryl ether sulfates, decyl ether sulfates, myristyl ether sulfates, dodecyl ether sulfates, stearyl ether sulfates, and the like. These compounds can be used individually or a mixtures of two or more. For example, commercially available alcohol ether sulfates may include mixtures of two or more of these compounds. Generally, the alcohol ether sulfates are prepared by reacting the alcohol with ethylene oxide at mole ratios to give the desired value for n in formula (I). Usually, the number of moles of ethoxy groups will vary and n will represent an average value corresponding to the desired number.

Particularly good results have been obtained with STEOL 7N (a product of Stepan Chemical Company, a 30% aqueous solution of sodium alkyl ether sulfate with an average of 7 moles ethoxy per mole alcohol). Other examples of the alkyl ether sulfate surfactants useful as component (A) include NEODOL 25-3S, (a product of the Shell Chemical Company), and STEOL 4N (a product of the Stepan Chemical Company).

The surfactants (B) above are acid salts derived from the reaction of N-alkyl substituted amino acids of formula:

$$R_1-NH-CH_2COOH \quad (II)$$

where $R_1$ is a linear or branched chain lower alkyl of from 1 to 4 carbon atoms, especially a methyl, for example, aminoacetic acids such as N-methylaminoacetic. acid (i.e. N-methyl glycine or sarcosine), N-ethylaminoacetic acid, N-butylaminoacetic acid, etc., with saturated natural or synthetic fatty acids having from 8 to 18 carbon atoms, especially from 10 to 14 carbon atoms, e.g. lauric acid, and the like.

These salts have the following formula:

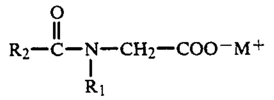

(III)

where M and $R_1$ are as defined above and $R_2$ represents a hydrocarbon chain, preferably a saturated hydrocarbon chain, preferably a saturated hydrocarbon chain, having from 7 to 27 carbon atoms, especially from 9 to 13 carbons atoms.

Specific examples of the compound of formula (III) as component (B) include, for example, sodium lauroyl sarcosinate, sodium myristoyl sarcosinate, sodium stearoyl sarcosinate, and the like, and the corresponding potassium and lithium salts.

Particularly good results have been obtained with Hamposyl TM L-30 (a product of W. R. Grace & Co. 30% aqueous solution of sodium lauroyl sarcosinate and sodium myristoyl sarcosinate). Similar aqueous solutions of sodium cocoyl sarcosinate and sodium myristoyl sarcosinate are also available from W. R. Grace & Co. under the trademarks Hamposyl C-30 and Hamposyl M-30, respectively. Sarkosyl NL-30 TM (a product of the Ciba-Geigy Chemical Corporation), Medialan KA TM (a product of the American Hoechst Corporation), and Maprosil 30 TM (a product of the Onyx Chemical Company) and other examples of sarcosinate anionic surfactants which can be used as component (B).

The (C) alkali metal salts of alkyl sulfates, are compounds of the general formula:

$$R_3SO_4^-M^+ \quad (IV)$$

where $R_3$ represents a linear or branched alkyl group of from about 8 to about 18 carbons atoms, preferably from about 10 to about 14 carbon atoms, and M is as previously defined.

Examples of compounds of formula (IV) include sodium, potassium and lithium salts of decyl sulfate, lauryl sulfate, myristyl sulfate, dodecyl sulfate, and the like. These compounds may be used individually or as mixtures of two or more.

Particularly good results have been obtained using STEPANOL WAC TM, a high purity aqueous solution—about 29 wt. percent solids—of sodium lauryl sulfate, which is substantially free from sodium chloride and contains about 0.2% sodium sulfate, and which is a trademarked product of Alcolac, Inc., Maryland. High purity sodium lauryl sulfate powder is also available as Maprofix 563 TM (a trademarked product of Onyx Chemical Co.). Other suitable commercially available alkyl sulfate anionic surfactants include Stephanol WA-100 TM (a product of the Stepan Chemical Company), and Conco Sulfate WR TM (a product of the Continental Chemical Company).

The compositions of the present invention may also contain any of a variety of adjuvants depending upon the particular form or end use that the product may have. These include perfumes, hypochlorite stabilizers, secondary pigments (e.g. $TiO_2$), surfactant builders, corrosion inhibiters, chelating and sequestering agents, etc. In the usual case, a hypochlorite stabilizer such as an alkali metal hydroxide (e.g. NaOH) will be incorporated in compositions of this invention. When said alkali metal hydroxide is present it will be present at a concentration in the range of from about 0.2% to about 1.5% by weight based on the total weight of the composition with the preferred range being from about 0.4% to about 0.6% on the same weight basis, and especially 0.5%.

When a secondary pigment is employed its concentration may also vary. Usually it will constitute between about 0.001% to about 0.5% by weight based on the total weight of the final composition with the preferred range being from about 0.01% to about 0.01% on the same weight basis.

Any of a variety of procedures may be used in preparing the compositions of this invention. In one satisfactory process the pigments are wetted out first with the alkyl ether sulfate and then the other surfactants and perfume are added and mixed. Enough water is added to the surfactants to give 30% of the final weight total. The remaining 70% of the final weight total is the hypochlorite premix solution.

The hypochlorite premix solution is typically prepared merely by diluting a concentrated, commercially available hypochlorite solution which contains sodium chloride and sodium hydroxide in addition to the sodium hypochlorite. The amount of hypochlorite in the premix may be calculated from the desired concentration in the final product and the relative weights of the hypochlorite premix and the surfactant premix. A trace amount of $MgCl_2$ is added to the hypochlorite premix and the solution is filtered through cartridges, which makes the premix solution sparkling clear. The surfactant premix is transferred to the bleach premix and the solution is stirred for 5 to 10 minutes.

The following Examples are given to further illustrate this invention. It is to be understood, however, that this invention is not limited thereto. The procedure employed is that outlined above. These products may be used for any of the purposes given in the second paragraph of this specification.

EXAMPLE 1

| Ingredient | W/W % |
|---|---|
| Sodium Lauryl Sulfate | 2.44 |

-continued

| Ingredient | W/W % |
|---|---|
| Sodium Lauroyl Sarcosinate | 0.16 |
| Sodium Laureth-7 Sulfate (Steol 7N) | 0.29 |
| Perfume | 0.25 |
| $TiO_2$ | 0.04 |
| Cobalt Aluminate (Shepherd Blue 214) | 0.01 |
| NaOH | 0.50 |
| NaOCl | 2.32 |
| $H_2O$ | QS to 100 |
| Viscosity range | 180–210 CPS. |
| Final hypochlorite range | 2.28% to 2.39% |

1. After 1 week the viscosity was 956 cps at room temperature.
2. These examples were included for comparative purposes.
3. Unless otherwise specified the cobalt aluminate employed is the commercial product sold under the trade designation SHEPHERD BLUE 214.
4. The cobalt aluminate employed is the commercial product sold under the trade designation BASF SICOTRANS BLUE 6315.
5. The cobalt aluminate employed is the commercial product sold under the trade designation Shepherd Blue 125. This is like Shepherd Blue 214 but differs in particle size.

The formula of Example 1 above and the formulas shown below may all be used for the purposes described in paragraph two of this specification.

The following Examples are given in tabular form (Table II). The process used in preparing the products given in Table II is the same as that given above.

The following materials identified in Table II by their trade names are defined as follows:

POLYACRYLIC Builder: Acrysol LMW-45, a 48% aqueous solution of a low molecular weight polyacrylic acid, manufactured by Rohm and Haas Company.

VANGEL ES: A colloidal magnesium aluminum silicate derived from natural smectite clay manufactured by R. T. Vanderbilt Company.

RHEOTHIK 80-11: A polysulfonic acid available from Henkel Corporation as a 14–17% aqueous solution.

METHOCEL J 40 MS: Hydroxypropyl methylcellulose available from Dow Chemical Company.

TABLE II-1

| Component | DJM 4 166B | DJM 4 166C | DJM 4 166D | DJM 4 166E | DJM 5 2C | DJM 5 2D | DJM 5 2E | DJM 5 2F | DJM 5 4A | DJM 5 4B | DJM 5 4C | DJM 5 4D | DJM 5 4E |
|---|---|---|---|---|---|---|---|---|---|---|---|---|---|
| Sodium Lauryl sulfate | 2.76 | 2.76 | 2.76 | 2.76 | 2.7 | 2.7 | 2.7 | 2.7 | 2.76 | 2.70 | 2.85 | 2.76 | 2.70 |
| Sodium Lauroyl sarcosinate | 0.24 | 0.24 | .24 | .24 | .3 | .3 | .3 | .3 | .24 | .3 | 0.15 | .24 | 0.3 |
| Sodium Laureth −7 sulfate | — | — | — | — | — | — | — | — | — | — | — | — | — |
| Perfume | 0.25 | .25 | .25 | .25 | .25 | .25 | .25 | .25 | .25 | .25 | .25 | .25 | .25 |
| Cobalt aluminate[3] | .01 | .005 | .05 | .05[4] | .01 | .005 | .05 | .05[4] | .01 | .01 | .01 | .01 | .01 |
| Titanium dioxide | .04 | .045 | — | — | .04 | .045 | — | — | .04 | .04 | .04 | .04 | .04 |
| Sodium hypochlorite | 2.49 | 2.18 | 2.45 | 2.10 | 2.30 | 2.47 | 2.44 | 2.45 | 2.33 | 2.24 | 2.31 | 2.33 | 2.27 |
| Sodium hydroxide | .5 | .5 | .5 | .5 | .5 | .5 | .5 | .5 | .5 | .5 | .5 | .5 | .5 |
| NaCl | 1.0 | 1.0 | 1.0 | — | — | — | — | — | — | — | 1.0 | 0.5 | 1.0 |
| Water | | | | | | | ←QS to 100%→ | | | | | | |
| Viscosity Cps. @ R.T. | 278 | 250 | 610[1] | 392 | 181 | 166 | 186 | 150 | 318 | 146 | 336 | 153 | 314 |

TABLE II-2

| Component | DJM 5 76A | DJM 5 76B | DJM 5 76C | DJM 5 76D | DJM 5 76E | DJM 5 68A | DJM 5 68B | DJM 5 68C | DJM 5 68D | DJM 5 68E | DJM 5 99B[2] |
|---|---|---|---|---|---|---|---|---|---|---|---|
| Sodium Lauryl sulfate | 2.76 | 2.40 | 2.88 | 2.79 | 2.70 | 2.76 | 2.55 | 2.88 | 2.82 | 2.7 | 2.70 |
| Sodium Lauroyl sarcosinate | .24 | .60 | 0.12 | .21 | .30 | 0.24 | 0.45 | 0.12 | 0.18 | 0.3 | 0.30 |
| Sodium Laureth | — | — | — | — | — | — | — | — | — | — | — |

TABLE II-2-continued

| Component | DJM 5 76A | DJM 5 76B | DJM 5 76C | DJM 5 76D | DJM 5 76E | DJM 5 68A | DJM 5 68B | DJM 5 68C | DJM 5 68D | DJM 5 68E | DJM 5 99B[2] |
|---|---|---|---|---|---|---|---|---|---|---|---|
| −7 sulfate | | | | | | | | | | | |
| Perfume | .25 | .25 | .25 | .25 | .25 | .25 | .25 | .25 | .25 | .25 | .25 |
| Cobalt aluminate[3] | .025 | .025 | .025 | .025 | .025 | .025 | .025 | .025 | .025 | .025 | — |
| Titanium dioxide | — | — | — | — | — | — | — | — | — | — | 0.5 |
| Sodium hypochlorite | 2.34 | 2.34 | 2.32 | 2.30 | 2.33 | 2.30 | 2.33 | 2.28 | 2.31 | 2.32 | 2.31 |
| Sodium hydroxide | .5 | .5 | .5 | .5 | .5 | .5 | .5 | .5 | .5 | .5 | .5 |
| NaCl | — | — | — | — | .50 | .333 | — | — | — | .33 | — |
| Water | | | | | | ←QS to 100%→ | | | | | |
| Viscosity Cps. @ R.T. | — | — | — | — | — | — | — | — | — | — | 202 |

TABLE II-3

| Component | DJM 5 99D | DJM 5 99E | DJM 5 99F | DJM 5 99G | DJM 5 167 | DJM 6 6A | DJM 6 88A | DJM 6 88B | DJM 7 68A | DJM 7 68B | DJM 7 68C | DJM 7 69A | DJM 7 69B | DJM 7 69C | DJM 7 83B | DJM 7 83C | DJM 7 83D | DJM 7 83E |
|---|---|---|---|---|---|---|---|---|---|---|---|---|---|---|---|---|---|---|
| Sodium Lauryl sulfate | 2.70 | 2.70 | 2.70 | 2.70 | 2.52 | 2.52 | 2.52 | 2.52 | 2.52 | 2.52 | 2.52 | 2.52 | 2.52 | 2.52 | 2.52 | 2.52 | 2.52 | 2.52 |
| Sodium Lauroyl sarcosinate | 0.30 | .30 | .30 | .30 | .165 | .165 | .165 | .165 | .165 | .165 | .165 | .165 | .165 | .165 | .165 | .165 | .165 | .165 |
| Sodium Laureth 7 sulfate | — | — | — | — | .315 | .315 | .315 | .315 | .315 | .315 | .315 | .315 | .315 | .315 | .315 | .315 | .315 | .315 |
| Perfume | 0.25 | .25 | .25 | .25 | .25 | .25 | .25 | .25 | .25 | .25 | .25 | .25 | .25 | .25 | .25 | .25 | .25 | .25 |
| Cobalt aluminate | — | .05[5] | .05 | .01 | .01 | .01 | .03 | .02 | .01 | .01 | .01 | .01 | .01 | .01 | .01 | .01 | .01 | .01 |
| Titanium dioxide | — | — | — | .04 | .04 | .04 | .005 | .005 | — | — | — | — | — | — | — | — | — | — |
| Sodium hypochlorite | 2.31 | 2.30 | 2.28 | 2.30 | 2.29 | 2.32 | 2.36 | 2.02 | 2.31 | 2.30 | 2.34 | 2.37 | 2.33 | 2.30 | 2.23 | 2.26 | 2.26 | 2.26 |
| Sodium hydroxide | .5 | .5 | .5 | .5 | .5 | .5 | .5 | .5 | .5 | .5 | .5 | .5 | .5 | .5 | .5 | .5 | .5 | .5 |
| Polyacrylic builder | — | — | — | — | — | .05 | — | — | — | — | — | — | — | — | — | — | — | — |
| Clay | — | — | — | — | — | — | — | — | .2 | .3 | .4 | .2 | .3 | .40 | — | — | — | — |
| Van Gel E.S. | — | — | — | — | — | — | — | — | — | — | — | — | — | — | 0.2 | 0.30 | .60 | .40 |
| Water | | | | | | | | | ←QS to 100%→ | | | | | | | | | |
| Viscosity Cps. @ R.T. | 210 | 241 | 235 | 212 | 210 | 108 | 210 | 228 | 241 | 271 | 290 | 395 | 279 | 314 | 214 | 231 | 290 | 219 |

| Component | SEB 15 62A | SEB 15 62B | SEB 15 62C | SEB 15 62D | SEB 15 62E | SEB 17 17 | SEB 17 173A | SEB 17 173B | SEB 17 173C | SEB 17 177A | SEB 17 177B | SEB 17 178A | SEB 17 178B | SEB 17 178C | SEB 17 178D | SEB 17 178E |
|---|---|---|---|---|---|---|---|---|---|---|---|---|---|---|---|---|
| Sodium Lauryl sulfate | 2.52 | 2.52 | 2.52 | 2.52 | 2.52 | 2.52 | 2.52 | 2.52 | 2.52 | 2.52 | 2.52 | 2.52 | 2.52 | 2.52 | 2.52 | 2.52 |
| Sodium Lauroyl sarcosinate | .165 | .165 | .165 | .165 | .165 | .165 | .165 | .165 | .165 | .165 | .165 | .165 | .165 | .165 | .165 | .165 |
| Sodium Laureth −7 sulfate | .315 | .315 | .315 | .315 | .315 | .315 | .315 | .315 | .315 | .315 | .315 | .315 | .315 | .315 | .315 | .315 |
| Perfume | .25 | .25 | .25 | .25 | .25 | .25 | .25 | .25 | .25 | .25 | .25 | .25 | .25 | .25 | .25 | .25 |
| Cobalt aluminate | .01 | .02 | .03 | .04 | .05 | .01 | .01 | .01 | .01 | .01 | .01 | .001 | .01 | .10 | 1.0 | 2.0 |
| Sodium hypochlorite | 2.33 | 2.33 | 2.32 | 2.31 | 2.32 | 2.38 | 2.36 | 2.39 | 2.34 | 2.33 | 2.34 | 2.31 | 2.38 | 2.30 | 2.28 | 2.34 |
| Sodium hydroxide | .5 | .5 | .5 | .5 | .5 | .5 | .5 | .5 | .5 | .5 | .5 | .5 | .5 | .5 | .5 | .5 |
| Van Gel E.S. | — | — | — | — | — | .25 | — | — | — | .6 | .6 | — | — | — | — | |
| Rheothik 80-11 | — | — | — | — | — | — | .5 | 1.0 | 2.0 | — | — | — | — | — | — | — |
| Methocel J 40 MS | — | — | — | — | — | — | — | — | — | .01 | .05 | — | — | — | — | — |
| Water | | | | | | | | ←QS to 100%→ | | | | | | | | |
| Viscosity Cps. @ R.T. | — | — | — | — | — | 338 | 344 | 326 | 286 | 453 | 473 | 354 | 327 | 351 | 396 | 337 |

To compare the stability of hypochlorite compositions colored with Ultramarine Blue on the one hand and cobalt aluminate on the other hand with respect to the loss of blue color over time, four compositions were prepared and identified by the following codes 1 SB36B; 14SB44; 14SB36A and 14SB36C.

The composition of the various formula are given in Table II below.

TABLE III

| | | Formulas for the Color Stability Study. | | | |
|---|---|---|---|---|---|
| | Trade | W/W | Percent | (100% active) | |
| Component | Name | 14SB36B | 14SB44 | 14SB36A | 14SB36C |
| Sodium Lauryl sulfate | Stepanol WA-C | 2.44 | 2.44 | 2.44 | 2.44 |
| Sodium Lauroyl sarco-sinate | Hamposyl L-30 | 0.16 | 0.16 | 0.16 | 0.16 |
| Sodium alkyl ether sulfate | Steol 7N | 0.29 | 0.29 | 0.29 | 0.29 |
| Perfume | Givaudan PA63713 | 0.25 | 0.25 | 0.25 | 02.5 |
| Cobalt aluminate | Shepherd Blue 214 | 0.01 | 0 | 0.05 | 0 |
| Ultra-marine Blue | Reckitt's UMB 05 | 0 | 0.01 | 0 | 0.05 |
| Titanium dioxide | Tioxide RHD6X | 0.04 | 0.04 | 0 | 0 |
| Sodium hypo-chlorite | Bleach | 2.32 | 2.32 | 2.32 | 2.32 |
| Sodium hydroxide | Caustic | 0.50 | 0.50 | 0.50 | 0.50 |
| Water | Water | QS to 100% | | | |

Samples of all of the above identified compositions were stored at room temperature in the absence of light for about 150 days. The initial and final bh values for each of the compositions were measured using a Pacific Scientific Colorgard-45 Colorimeter which employs a Hunter Lab System.

The bh value is a measure of the degree of blueness that a sample of material exhibits. The more the negative bh value that a sample exhibits, the bluer the color of the sample. As the bh values become less negative and finally acquire positive values the samples are becoming less blue and more yellow.

Table IV below summarizes the results of these tests.

TABLE IV

| | | Percent Loss of Blue Color[1] | | | | |
|---|---|---|---|---|---|---|
| Ref. No. | Color | Pigments | Initail bh Value | Final bh Value | Time Elapse | Percent Loss Blue Color |
| 14SB36B | powder blue | CoAl/TiO2 | −12.98 | −12.94 | 151 d | 0.3% |
| 14SB44 | " | UMB/TiO2 | −17.11 | 5.59 | 148 d | 74.2% |
| 14SB36A | dark blue | CoAl | −42.19 | −41.46 | 151 d | 1.7% |
| 14SB36C | " | UMB | −42.98 | −13.86 | 151 d | 67.8% |

Note 1: Percent loss of blue color was calculated by this formula:

$$\% \text{ loss blue} = \frac{(\text{initial bh} - \text{final bh}) \times 100}{\text{initial bh}}$$

This data suggests that the pigment, ultramarine blue, which has been characterized as stable to hypochlorite actually looses color in a hypochlorite solution. Cobalt aluminate is extremely stable in hypochlorite and does not loose any blue color.

As indicated above, the Lister article indicates that the decomposition of sodium hypochlorite is catalyzed by oxides of cobalt. One might expect that, in view of this teaching, not sodium hypochlorite would be unstable in the presence of cobalt aluminate and tend to decompose.

Unexpectedly it was found that the stability of hypochlorite is affected only minimally by cobalt aluminate. This was demonstrated by measuring the half-life of the hypochlorite ion contained in a hypochlorite composition containing a quantity of cobalt aluminate and titanium dioxide on the one hand and only titanium dioxide on the other hand after storage over a period of time at room temperature in absent of light. The formula of the respective composition are given in Table V below:

Formulas for the Color Stability Study.

TABLE V

| | | W/W Percentage (100% active) | |
|---|---|---|---|
| Component | Trade Name | SB-13-160A | SB-13-160C |
| Sodium lauryl sulfate | Stepanol WA-C | 2.52 | 2.52 |
| Sodium lauroyl sarcosinate | Hamposyl L-30 | 0.165 | 0.165 |
| Sodium alkyl ether sulfate | Steol 7N | 0.315 | 0.315 |
| Perfume | Givaudan PA63713 | .25 | .25 |
| Cobalt aluminate | Shepherd Blue 214 | .01 | 0 |
| Titanium dioxide | Tioxide RHD6X | .04 | .05 |
| Sodium hypochlorite | Bleach | 2.32 | 2.30 |
| Sodium hydroxide | Caustic | .5 | .5 |
| Water | Water | QS to 100% | |

The results of these tests are summarized in Table VI below.

TABLE VI

| Sample | % CoAl | Initial % OCl | Final % OCl | Time Period | Half Life[1] |
|---|---|---|---|---|---|
| SEB-13-160A | 0.01 | 2.32% | 2.15% | 35 days | 443 days |
| SEB-13-160C | 0 | 2.30% | 2.15% | 35 days | 502 days |

Note 1: The half life calculation is as follows:

$$k = \frac{(\text{initial \% OCl} - \text{final \% OCl})}{(\text{initial \% OCl})(\text{final \% OCl})(\text{time})}$$

$$\text{Half Life} = \frac{1}{k(\text{initial \% OCl})}$$

The results of Table V show that after 35 days the difference in the concentration of hypochlorite in composition SEB-13-160A and SEB-13-160C is not significant. Even when the half life for hypochlorite is calculated for the respective compositions only minimal differences are obtained.

Another unexpected characteristic of the present hypochlorite compositions are their relative stability against the sedimentation of the pigments. For example, although cobalt aluminate is denser than titanium dioxide (cobalt aluminate 4.2 to 4.3 g/cc as compared with titanium dioxide 1.95 to 2.0 g/cc) compositions containing the former settle at about the same time as compositions containing the latter. Three thickened hypochlorite samples were prepared which were the same in all respects, excepting as to the pigment which were as follows for the respective samples.

(A) 0.01% Cobalt aluminate + 0.04% $TiO_2$;

(B) 0.05% $TiO_2$;

(C) 0.05% cobalt aluminate.

These compositions were centrifuged and the sedimentation measured periodically with calipers. It was found that all three formulation began to settle at about the same time.

What is claimed is:

1. A composition comprising an aqueous vehicle having incorporated therein an effective oxidizing amount of a hypochlorite ion and a colorant system containing one or more pigments selected from the group consisting of cobalt aluminate and cobalt chromite, said pigments not having a coating and being present in sufficient concentration to impart color to said composition.

2. The composition of claim 1 wherein the source hypochlorite ion is an alkali metal hypochlorite.

3. The composition of claim 2 wherein said pigment is present in said composition at a concentration in the range of from about 0.001% to about 0.5% by weight based on the total weight of said composition.

4. The composition of claim 1 wherein said pigment is cobalt aluminate.

5. The composition of claim 4 wherein the source of hypochlorite ion is an alkali metal hypochlorite.

6. The composition of ..claim 5 wherein the cobalt aluminate is present in said composition at a concentration in the range of from about 0.001% to about 0.5% by weight based on the total weight of the composition.

7. The composition of claim 6 wherein the concentration of said cobalt aluminate is in the range of from about 0.01% to about 0.1% by weight based on the total weight of the composition.

8. The composition of claim 6 wherein said composition is a thickened hypochlorite composition.

9. The composition of claim 6 having a viscosity in the range of from about 50 cps. to about 5,000 cps.

10. The composition of claim 6 in which the viscosity is in the range of from about 100 cps. to about 610 cps.

11. The composition of claim 6 wherein said colorant system also comprises a second pigment.

12. The composition of claim 11 wherein said second pigment is titanium dioxide.

13. The composition of claim 8 wherein the hypochlorite is thickened with a combination of anionic surfactants consisting essentially of (a) at least one alkali metal salt of an N-alkyl, N-fatty acyl amino acid; and (b) at least one alkali metal salt of an alkyl sulfate.

14. The composition of claim 10 including a stabilizing amount of an alkali metal hydroxide.

15. The composition of claim 13 wherein the combination of surfactants also includes at least one alkali metal salt of an ethoxylated aliphatic alcohol.

16. A composition of claim 15 including a stabilizing amount of an alkali metal hydroxide.

17. The composition of claims 3, 6, 13 or 16 wherein said hypochlorite is present in said composition in the range of from about 0.5% to about 10% by weight, based on the total weight of the composition.

18. The composition of claim 4 in the form of an aqueous cleansing composition, wherein (1) said cobalt aluminate is present in the composition at a concentration of about 0.01% to about 0.1% by weight based on the total weight of the composition;

(2) said hypochlorite is present at a concentration in the range of from about 1% to about 7% by weight based on the total weight of said composition;

(3) said composition is thickened by an anionic surfactant system containing on a weight basis, based on the total weight of said composition:

i. from about 1% to about 5% sodium lauryl sulfate, ii. from about 0.1% to about 1.5% sodium lauroyl sarcosinate, and iii. from about 0.1% to about 1.5% sodium lauryl ether sulfate;

said composition having a viscosity in the range of from about 100 to about 610 cps.

19. The composition of claim 18 containing as a stabilizing agent from about 0.2 to about 1.5% by weight alkali metal hydroxide based on the total weight of the composition.

20. The composition of claim 18 also including from about 0.01% to about 0.1% by weight of titanium dioxide based on the total weight of the composition.

21. A process for cleaning a surface which comprises applying to said surface a composition of claim 1.

* * * * *